(12) United States Patent
Urrego Lopera et al.

(10) Patent No.: US 9,388,654 B2
(45) Date of Patent: Jul. 12, 2016

(54) HIGH PRESSURE MECHANICAL SEAL FOR CABLES AND POWER LINES IN OIL WELLS

(71) Applicant: SOLPETROCOL S.A.S., Medellin (CO)

(72) Inventors: Alejandro Urrego Lopera, Medellin (CO); Juan David Ospina Medina, Medellin (CO)

(73) Assignee: SOLPETROCOL S.A.S., Medellin (CO)

( * ) Notice: Subject to any disclaimer, the term of this patent is extended or adjusted under 35 U.S.C. 154(b) by 371 days.

(21) Appl. No.: 13/916,180

(22) Filed: Jun. 12, 2013

(65) Prior Publication Data
US 2014/0339774 A1 Nov. 20, 2014

(30) Foreign Application Priority Data
May 17, 2013 (CO) .................................. 13-122315

(51) Int. Cl.
*E21B 33/03* (2006.01)
*E21B 33/04* (2006.01)
*E21B 33/038* (2006.01)

(52) U.S. Cl.
CPC .................................. *E21B 33/0385* (2013.01)

(58) Field of Classification Search
CPC ............ E21B 33/0385; E21B 33/0407; E21B 2033/005
USPC ........................... 166/368, 65.1; 277/322, 323
See application file for complete search history.

(56) References Cited

U.S. PATENT DOCUMENTS

| | | | | | |
|---|---|---|---|---|---|
| 4,583,804 | A | * | 4/1986 | Thompson | H01R 13/533 439/470 |
| 4,693,534 | A | * | 9/1987 | Clark | H01R 13/533 439/275 |
| 4,728,296 | A | * | 3/1988 | Stamm | E21B 17/028 439/275 |
| 4,874,328 | A | * | 10/1989 | Le Dall | H01R 13/523 439/275 |
| 5,377,747 | A | * | 1/1995 | Didier | E21B 33/04 166/65.1 |
| 6,688,386 | B2 | * | 2/2004 | Cornelssen | E21B 33/0407 166/65.1 |
| 7,718,899 | B2 | * | 5/2010 | Benestad | H01B 17/30 174/152 R |
| 8,342,865 | B2 | * | 1/2013 | Scheibelmasser | E21B 17/028 430/191 |
| 2013/0309888 | A1 | * | 11/2013 | Nicholson | E21B 17/025 439/271 |

* cited by examiner

*Primary Examiner* — Matthew R Buck
(74) *Attorney, Agent, or Firm* — Lucas & Mercanti, LLP

(57) ABSTRACT

The present high pressure mechanical seal features a novel configuration capable of sealing from one up to simultaneously five power conduction lines, flow injection lines or control lines, in the same device. Adaptable to different configurations, types and size of conduction lines existing in the industry. The power conduction lines can be a cable of an electro-submersible pump or the cable in a down hole heater; the flow and control lines can be diluents injector capillaries or data and instrumentation cables or any other type of conduction line which can enter the inner atmosphere of the wellbore. Conduction lines are generally shaped as uniform cylindrical elements, which vary in diameter and material due to the cylindrical geometry, are adaptable to the sealing system of the present invention, such that the equipment can seal from only one line up to five lines depending on the requirement of the user.

5 Claims, 4 Drawing Sheets

HIGH PRESSURE MECHANICAL SEAL FOR CABLES AND POWER LINES IN OIL WELLS

CROSS-REFERENCE TO RELATED APPLICATIONS

This Application claims the priority of Colombian Patent Application No. CO-13-122315 filed on May 17, 2013, the contents of which is incorporated herein by reference in its entirety.

The equipment object of the present invention is a high pressure mechanical seal which is installed in the head of oil wells. Its function is to allow the passage of lines, through the orifice in the dangler of the production pipe, located inside the head and to hermetically seal the inner atmosphere of the wellbore.

BACKGROUND OF THE INVENTION

The equipment object of the invention has its application in the oil industry, specifically in the field of gas and oil production, where it is necessary to pass lines through the head to downhole. The most commonly used lines are electrical cables and flow and control lines. The function of a line, depending on the structure, is to transport electrical power, fluids and information, from a source/receiver on the surface to a source/receiver in downhole. The line must pass through the wellhead through a hole in the dangler of the production pipeline.

During the production of gas and oil, internal pressures are generated in the oil wells which must be safely contained, in order to avoid leaks which represent accidents, production losses, pollution, among other negative factors. To guarantee that such pressures are kept contained inside the wellbore (annular space), it is necessary to hermetically seal all the elements entering and exiting from the wellbore to the surface.

Lines are elements commonly circulating through the hole in the dangler of the production pipeline, such dangler is also seated inside the wellhead. The hole represents an opening which must be sealed to avoid the hazardous leaks, such sealing function is fulfilled by the system of the present invention.

The equipments currently used in the oil field to seal the lines in the wellheads, show shortcomings with the requirements of the existing technologies, which led to an innovative development eliminating the disadvantages of such systems in the current oil industry, the equipments cited as reference for this new invention are BIW and SPLICE FOR DOWN HOLE ELECTRICAL SUBMERSIBLE PUMP CABLE (QCI).

The most common problems of the current technologies are the access for maintenance of the equipment, time of installation and adaptability to reduced and/or specific spaces. In respect to the first problem, it generates a very expensive intervention by the operator of the wellbore, which requires a great logistic both in equipment and in staff to verify the functioning of the equipment.

The time of installation of these connectors in the oil fields id vital, the time saving is reflected on significant incomes for the operator, the current models (BIW/QCI) require between 2 and 4 hours to be installed. Likewise, these systems do not allow to simultaneously and individually seal each of the lines entering the wellbore.

The innovation is based on taking benefit of such design disadvantages having the most common current equipment (BIW/QCI) in the market and to eliminate them with a new versatile, easy installation and maintenance system, this seal has the advantage of being installed in less than 45 minutes and being inspected over the head, in addition it can seal from one to five lines simultaneously.

The technologies considered as reference are:
1. BIW Connector Systems, U.S. Pat. No. 5,762,135: Manufactured by ITT Corporation (Santa Rosa, Calif.), is a connector being a splice between the cable coming from the electro-submergible pump (ESP) and the surface cable, isolating the inner atmosphere of the wellbore with the outside, with current interruption, this connector is installed inside the head.
2. Splice for down hole electrical submersible pump cable, U.S. Pat. No. 4,181,175: manufactured by Quick Connectors Inc. (Houston, Tex.). It refers to a splice system, which establishes the communication between two ends of the power cable of a electro-submersible pump, this connector is installed inside the head.

Currently, there is no device capable of simultaneously seal all the lines required to be installed inside an oil well. In addition, there are several deficiencies in the installation, operation and uninstalling of the conventional sealing systems, due to some, such as QCI, use epoxy compounds as a base for the seal, which increases the installation time, does not guarantee tightness of the seal, and makes it impossible to reuse the equipment, given that the sealing effect of the epoxy is not reversible. Other systems, such as BIW, use splices and interrupt the electrical fluid flow, generating thereby possible failure points, in addition to take 4 hours average for each of the splices made, if it is made under optimal environmental conditions. All this represents high operation costs, in relation to additional working time, labor hours and machine hours employed, aside from the problems that may be consequently generated by the operative deficiencies. Both QCI and BIW are designed to seal only cables for electro-submersible systems, and they exclude other lines that must be sealed by other systems.

At the moment of servicing (maintenance) or to perform an intervention on the wellbore, the conventional sealing systems cannot be inspected from the surface due to its installation is performed underneath the dangler of the production pipeline, whereby it is necessary to use an equipment for lifting the entire wellbore for lifting the production string, which corresponds to excessive not estimated costs, taking into account that it is not possible to predict the number of times a wellbore must be serviced during its working life. The equipment of the present invention is installed over the dangler of the production pipeline, i.e. it is located outside the head.

The equipment of the present invention solves all the above mentioned problems as follow:
1. It is designed to simultaneously seal flow conduction lines, data cable and electric power cables in oil wells.
2. Can be operated, serviced and inspected over the head of the wellbore.
3. It does not use epoxy compounds.
4. It does not require any kind of connection, whereby the fluid is not interrupted.
5. It is totally reusable in its main structure, given that it is manufactured in stainless steel.
6. Installation is performed in less than 1 hour.
7. It can be installed under any environmental condition.

SUMMARY OF THE INVENTION

The design of the present high pressure, mechanical seal features a novel configuration due to it is the only device in the world capable of sealing from one up to simultaneously five power conduction lines, flow injection lines or control lines, in the same device. It can be installed in the different configurations, types or sizes of the conduction lines existing in the industry, given that it is totally adaptable. The power conduction lines can be the cable of an electro-submersible pump or the cable of a heater for down hole; the flow and control lines can be diluents injecting capillaries or data and instrumentation cables or any other type of conducting line that must enter the inner atmosphere of the wellbore. Conduction lines are generally shaped as uniform cylindrical elements, which vary in diameter and material, due to the cylindrical geometry, these are completely adaptable to the sealing system of the equipment of the present invention, such that the equipment can seal from one to five lines depending on the requirements of the user.

The system is composed of four pieces. The adapter bushing which is coupled to the dangler of the production pipeline, the main sealing body which is coupled to a receptacle called seal seat, the sealing seat is housed inside the adapter bushing and the entire set comprises an upper cover called seal head which is coupled by thread to the adapter bushing. The resulting tightness from the pressure exerted by the sealing body prevents any fluid contained in the wellbore from leaking, whether such substances are liquid or gas, or any other element present inside the wellbore (annular space).

The system is complemented with the secondary seals composed by static joints in charge of sealing the outside of the equipment. The equipment of the present invention can be reused in its main structure and it is recommendable to only replace the sealing elements when maintenance is performed. This system replaces other systems existing in the market without requiring any modification in the well head.

BRIEF DESCRIPTION OF THE DRAWINGS

FIG. 5 shows the main sealing body (6) for this embodiment of the invention, with a longitudinal through hole (9), where the conduction line (8) passes through.

DETAILED DESCRIPTION OF THE INVENTION

Figure 1:
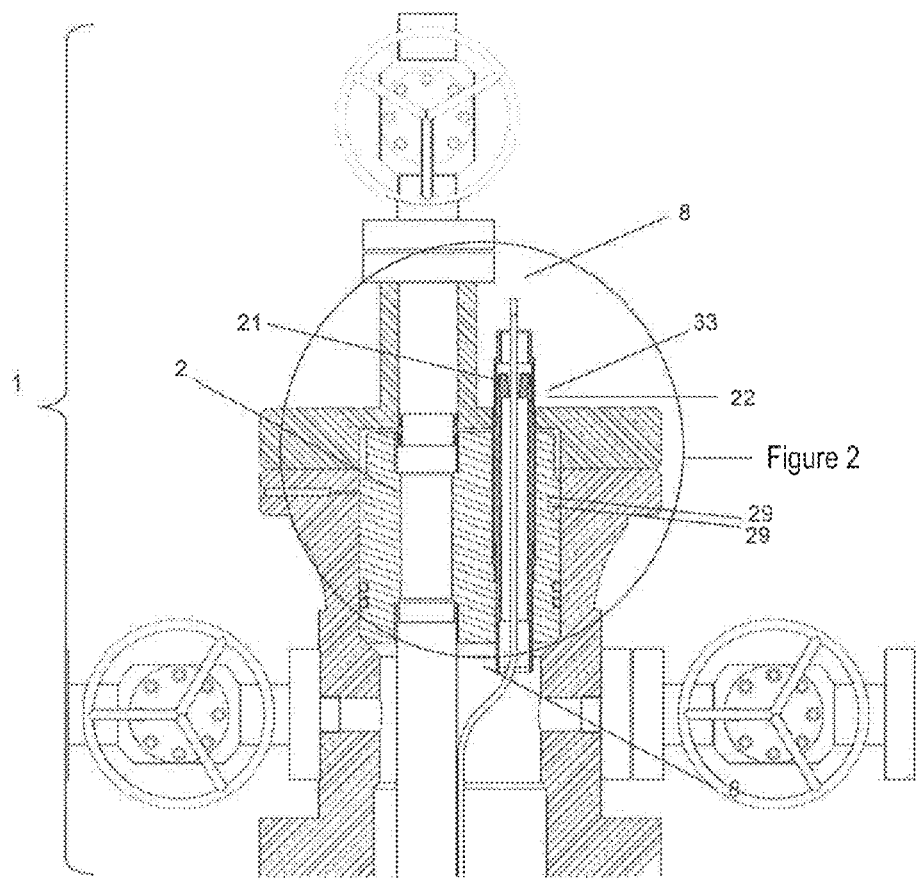
FIG. 1 shows a section of the generic well head (1) with a hole (21) for passing the conduction line(s) (8), within which the dangler of the production pipeline (2) is disposed.

FIG. 1 shows a section of a well head (1) featuring a hole (21) through which the conduction line(s) pass, the dangler of the production pipeline (2) is disposed inside the head and it also features a hole (22) aligned with the hole (21) of the head. The contact zone (33) between the adapter bushing (4) and the well head (1) is sealed through two static joints (34).

Figure 2:
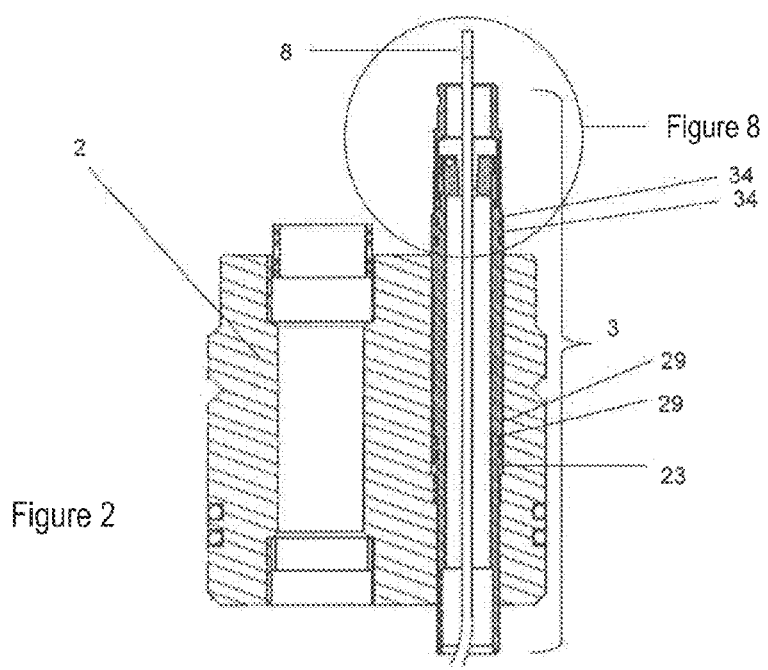
FIG. 2 shows an enlarged view of the image in FIG. 1, where the dangler of the production pipeline (2), the conduction line (8) and the assembly of the equipment of the present invention (3) are detailed.

FIG. 2 shows an approach of FIG. 1, with the system of the present invention (3) assembled inside the dangler of the production pipeline (2), with a conduction line (8) passing through the entire system. The assembly is secured by means of the middle outer thread (23) of the adapter bushing (4). The contact zone between these two elements is sealed with two static joints (29) located in proximity to the middle outer thread (23) of the adapter bushing (4).

Figures 3A, 3B:
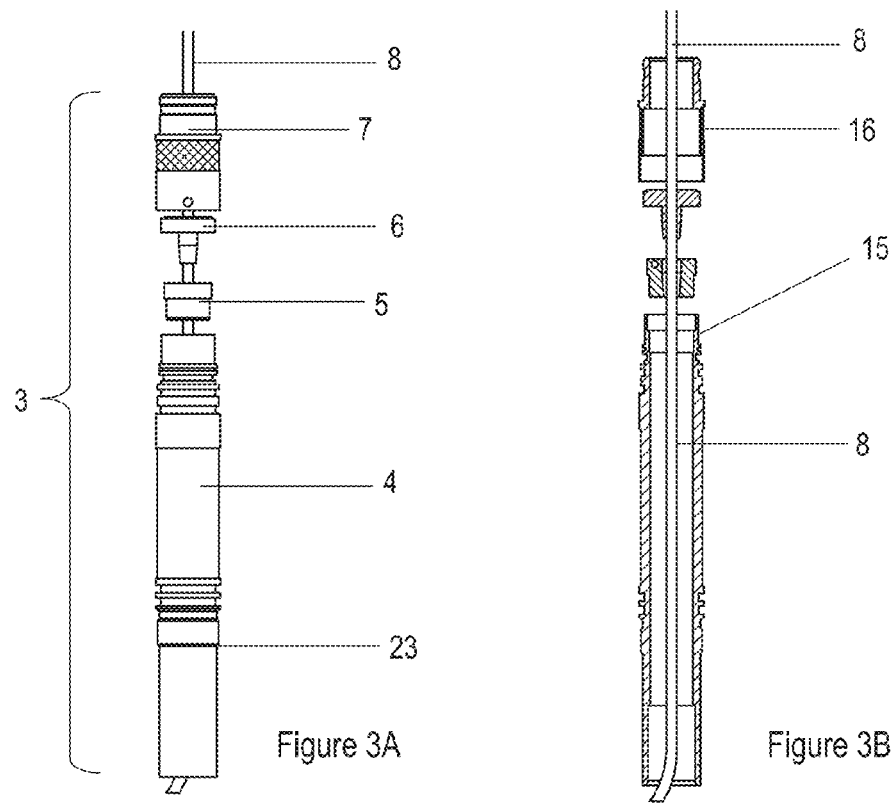
FIG. 3A shows the components of the system of the present invention (3) in its position and order of assembly, it is an exploded representation.
FIG. 3B shows the components of the system of the present invention (3) with sectional view, wherein the inner configuration of the elements and the conduction line (8) passing through are appreciated.

FIG. 3A shows the components of the system of the present invention (3) in its position and order of assembly, it is an exploded representation, and the seal head (7), the main sealing body (6), the seal seat (5) and the adapter bushing (4) are separately observed.

FIG. 3B shows the components of the system of the present invention (3) with sectional view, wherein the inner configuration of the elements and the conduction line (8) passing through are appreciated. The inner thread (16) of the seal head (7) and the inner cavity (15) of the adapter bushing (4) are detailed.

Figure 4:
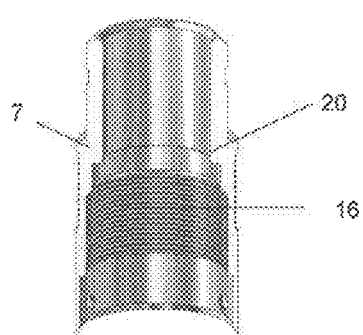
FIG. 4 shows in a cross-section view, the seal head (7), it inner cavity (20) to push the main sealing body (6), and the inner thread (16) to be coupled to the upper outer thread (14) of the adapter bushing (4).

FIG. 4 shows a cross sectional view of the seal head (7) its inner cavity (20) for pushing the main sealing body (6) and the inner thread (16) to be coupled to the outer thread (14) of the adapter bushing (4) in its upper part.

Figure 5:
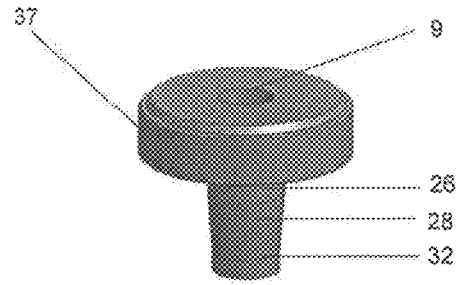

FIG. 5 shows the main sealing body (6), for this embodiment of the invention, with a longitudinal through hole (9) from its cylindrical base (37), by which the conduction line (8) passes through. It has a straight cylindrical projection (26) concentric with the through hole (9), followed by a diameter reduction (28) and finished in a straight circular section (32).

Figure 6:
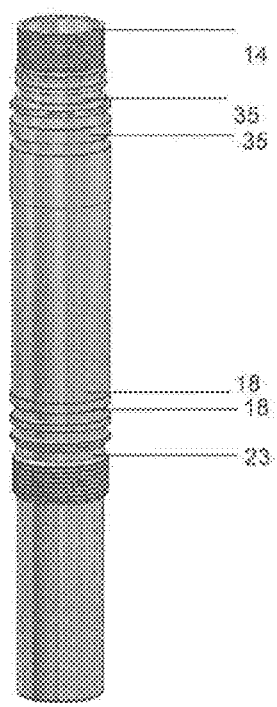
FIG. 6 shows an isometric view of the adapter bushing (4), where the middle outer thread (23) to be coupled to the dangler of the production pipeline (2), and the upper outer thread (14) to be coupled to the seal head (7) are shown.

FIG. 6 shows the adapter bushing (4) in an isometric view, where the middle outer thread (23) to be coupled to the dangler of the production pipeline (2), and the upper outer thread (14) to be coupled with the inner thread (16) of the seal head (7) are appreciated. Likewise, the lower perimeter cavities (18) are shown to house the static joints (29) creating a seal with the dangler of the production pipeline (2), and the upper perimeter cavities (35) housing the static joints (34) creating a seal between the adapter bushing (4) and the well head (1), in the contact zone (33).

Figure 7:
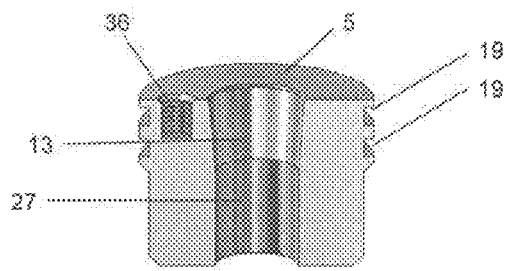
FIG. 7 shows a sectional view of the seal seat, the geometrical detail of the passing through cylindrical hole (27) with sinks (13) and the arrangement of the perimeter cavities for the static joints (19).

FIG. 7 shows the seal seat (7) for this embodiment of the invention having a straight cylindrical perforation (27) passing through and with sinks in the upper part (13). It has two perimeter cavities (13) in its external surface where two static joints (24) are housed sealing the contact surface (25). A non-through threaded perforation (36) is shown to facilitate the extraction of the seal seat (5), the adapter bushing (4) in the uninstall process of the system.

The seal seat (5) and the main sealing body (6) according to an embodiment of the invention, have as much holes as lines to be sealed are required, whereby the main object of the invention is to guarantee an effective seal in just one conduction line (8), as well as two, three, four and five, under the same mechanical seal principle by high pressure expansion.

Figure 8:
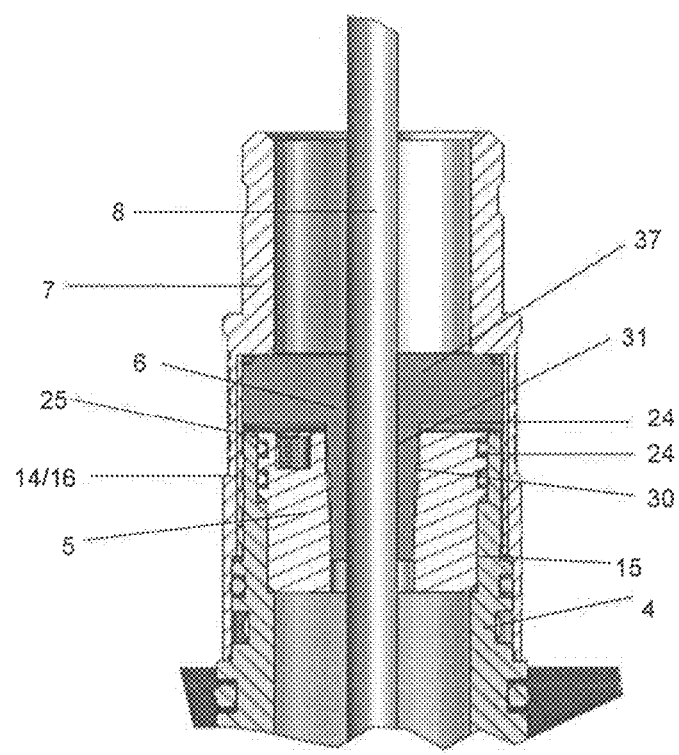
FIG. 8 shows a cross sectional view, detailing the upper part of the equipment of the present invention (3), with its components assembled.

FIG. 8 shows the detail of the assembly of the components of the system of the present invention (3). In the upper inner cavity (15) inside the adapter bushing (4), the seal seat (5) is housed. The contact surface (25) between these two components is sealed by two static joints (24), which are housed inside the perimeter cavities (19) of the seal seat (5). The adaptor bushing (4) having an outer thread (14) in the upper part, which is coupled to the inner thread (16) of the seal head (7). The mechanical strength exerted by the thread between both pieces, is transmitted to the cylindrical base (37) of the main sealing body (6) supported on the inner cavity (20) of the seal head (7), the main sealing body (6) is compressed towards the seal seat (5) and the straight cylindrical projection (26) with reduction of diameter (28) and straight cylindrical termination (32) of the main sealing body (6) is inserted in the straight cylindrical through perforation (27) with sinks (13) of the seal seat (5).

The tightness is effective with the deformation suffered by the main sealing body (6), which, for being an elastomer, expands radially outwards its straight cylindrical projection (26) with diameter (28) reduction and straight cylindrical termination (32), towards the entire wall (30) of the straight through cylindrical perforation (27) with sinks (13) of the seal seat (5). Such expansion exerts a force capable of containing a pressure or 70 MPa. Likewise, the expansion is radially produced towards the inside of the through perforation (9) of the main sealing body (6), embracing the outer surface (31) of the conduction line (8) in a length of 30 to 40 mm, resulting thereby in a total tightness inside and outside the main sealing body (6).

Figure 9:
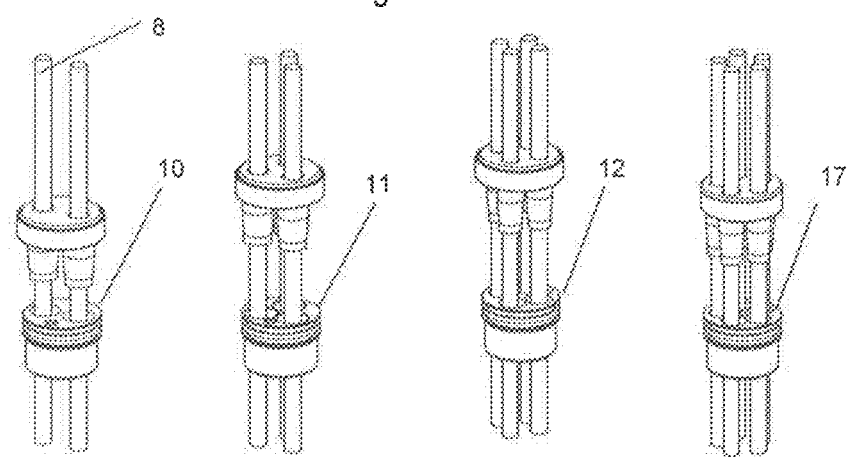
FIG. 9 shows the configuration, seal body (6) and seal seat (5) in an embodiment for two (10), three (11), four (12) and five (17) conduction pipelines to be sealed.

FIG. 9 shows the configuration, seal body (6) and seal seat (5), with the respective conduction lines (8) in an embodiment for two (10), three (11), four (12) and five (17) conduction lines to be sealed. The adaptor bushing (4) and the seal head (7) are constant for the different options and number of conduction lines to be sealed.

The invention claimed is:

1. A high pressure mechanical seal comprising:
    an adapter bushing comprising a first portion having a first outer surface and a first thread defined on the first outer surface, the first portion having a first diameter, the first portion further comprising a first cavity;
    a seal seat comprising one or more cylindrical perforations that pass through the seal seat, the seal seat further comprising a second outer surface that comprises a plurality of second cavities, and a plurality of static joints disposed in the plurality of second cavities, the seal seat being adapted to fit into the first cavity of the adapter bushing, wherein the plurality of static joints forms a seal between the adapter bushing and the seal seat when the seal seat is housed in the adapter bushing;
    a main sealing body comprising a cylindrical base and one or more cylindrical projections, wherein each of the one or more cylindrical projections includes a region having a diameter that decreases as a distance from the cylindrical base increases and a hole that passes through the cylindrical base and the respective cylindrical projection, wherein the respective cylindrical projection is adapted to fit into a corresponding one of the one or more cylindrical perforations of the seal seat; and
    a seal head having a second portion comprising an inner surface and a second thread defined on the inner surface, the second portion of the seal head having a second diameter greater than the first diameter of the first portion of the adapter bushing, the seal head being adapted to fit over an end portion of the adapter bushing, wherein the second thread of the seal head is adapted to couple to the first thread of the adapter bushing.

2. The high pressure mechanical seal according to claim 1, wherein the adapter bushing further comprises a third portion having a third outer surface, and a third thread disposed on the third outer surface of the third portion, the third thread being adapted to connect to a dangler of a production pipeline inside a wellbore, wherein the plurality of static joints of the seal seat comprise two static rubber joints.

3. The high pressure mechanical seal according to claim 2, wherein the seal seat is cylindrical and has a height between 40 and 50 mm, wherein each of the one or more cylindrical perforations of the seal seat is adapted to receive a corresponding one of the one or more cylindrical projections of the main sealing body, the seal seat further comprising a threaded perforation that does not pass through the seal seat, the threaded perforation being adapted to facilitate extraction of the seal seat from the adaptor bushing during a system uninstall process.

4. The high pressure mechanical seal according to claim 3, wherein the cylindrical base of the main sealing body has a height and a third diameter, the height being less than the third diameter, wherein a fourth diameter of each of the one or more cylindrical projections of the main sealing body decreases by 20 to 15 mm from the cylindrical base to a region in a middle of the respective cylindrical projection, each of the one or more cylindrical projections also comprising an end section having a uniform diameter, wherein the main sealing body is formed of an elastomer.

5. The high pressure mechanical seal according to claim 4, wherein the seal head is substantially cylindrical and comprises a neck having a fifth diameter and a body portion, wherein the second portion having the second thread is disposed in the body portion, the fifth diameter of the neck being less than the second diameter of the second portion.

* * * * *